May 2, 1967 G. J. KREIER, JR 3,317,178
LINING FOR LIGHTWEIGHT FIBERGLASS REINFORCED POLYESTER RESIN MOLD
Filed July 18, 1966
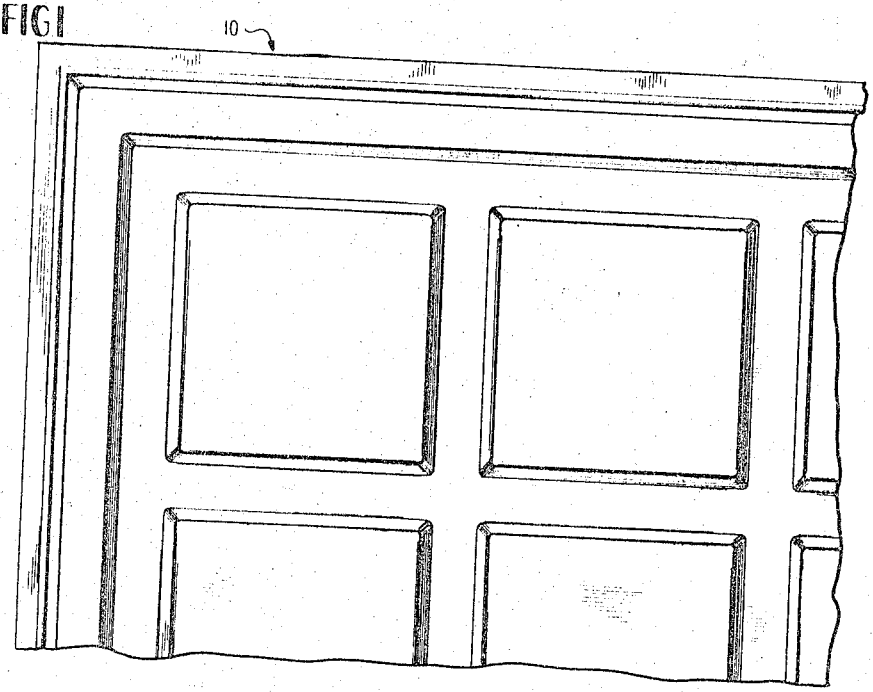
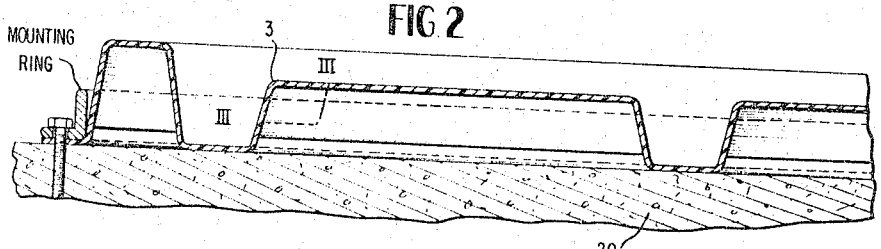
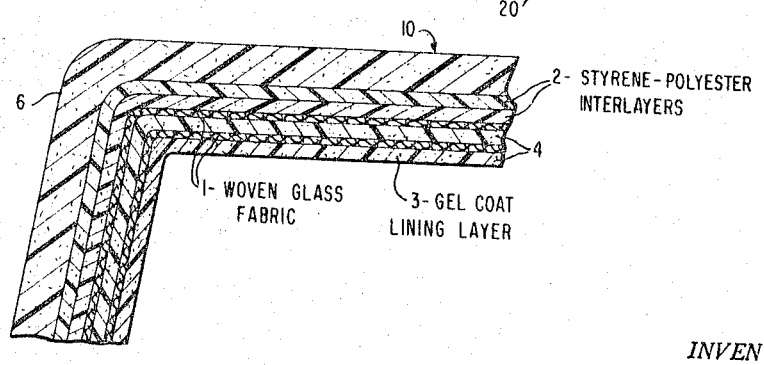
INVENTOR.
GEORGE J. KREIER, JR.
BY
Abraham A. Sobbity
Attorney 3,317,178
LINING FOR LIGHTWEIGHT FIBERGLASS REINFORCED POLYESTER RESIN MOLD
George J. Kreier, Jr., 1524 Cambridge St.,
Philadelphia, Pa. 19130
Filed July 18, 1966, Ser. No. 566,029
2 Claims. (Cl. 249—134)

The present invention is a continuation-in-part of my copending application Ser. No. 455,794, filed May 14, 1965, now Patent No. 3,295,818, and is directed to a divisible species of lining composition in lightweight fiberglass reinforced polyester molds and antifriction products which are disclosed in the parent application.

In the parent application, a novel mold for pouring concrete structures is claimed in which the filler in the styrene polyester gel coat is restricted to fibrous talc in critical proportions of 15–35% by weight. The specification of the present invention is specifically directed to hydrophilic fibers in an enumerated group consisting of either ethyl cellulose, cellulose propionate, cellulose acetate, caprolactam, polyvinyl alcohol, regenerated cellulose, and chopped cotton.

The critical feature of these hydrophilic fibers is the size of the filament, which is essential in order to produce water absorption to effectively float water at the surface of the gel during concrete setting use in contact with wet concrete. The filament must be less than ⅛ inch in length, at least 60% of the fibers being less than ¹⁄₃₂ inch in length, and 90% of the fibers being less than ¹⁄₁₆ inch in length. The fiber diameter is from 2 to 10 denier weight per filament. This represents a particle size which is significantly different from the particle size of the fine filler talc which is described herein and claimed as the preferred species in my copending allowed patent application Ser. No. 455,794.

The present invention relates to a new lining for lightweight fiberglass reinforced polyester resin molds as are used in forming poured masonry construction, especially concrete, the new lining providing improved durability of the mold for heavy duty commercial repetitive casting operations, and improved quality of the surface finish of the molded concrete product and permitting the achievement of complicated, deep-surface cut, molding designs; e.g., deep-draw, undercut waffle board structures, and the like, which cannot be achieved if shell-like glass fabric molds of the type shown in Sperry U.S. Patent No. 2,441,548, dated May 11, 1948, or in Schmocker U.S. Patent No. 3,153,835, dated Oct. 27, 1964, are used in conjunction with mold-release agents.

The usual rigid fiberglass reinforced plastic laminate is unsuitable for repetitive casting operations for large scale structures in which there are provided deeply cut portions because of excessive wear of the plastic surface of the mold which occurs during speration of the hardened concrete structural member from the mold. It is customary to employ crane equipment, lift hoists, compressed air hammers, during the lifting separation of the shell-like mold from the hardened, cast concrete product. In practice, it is desirable to employ the simplest outline framework of wooden joists to eliminate undesired buckling tendencies of the shell-like mold; and it would be expected that the flexing distortion of the central areas of the mold would facilitate separation after the concrete has hardened.

Unfortunately, the deep cut sections of hardened concrete have extremely low tensile strength and are easily broken or damaged. The plastic material, whether of the polyester-styrene type of mixed resin or of the epoxy resin type is substantially corroded and eroded at its parting surface by the concrete. As a result, it has been necessary to carefully clean and polish the mold between production runs and to continually seek better mold-release agents so as to reduce the corrosion and erosion of the mold.

The U.S. patent to Graham et al., No. 3,124,626, specifies wax, or polyvinyl alcohol, or combinations of wax and polyvinyl alcohol as the mold-release material to be applied to a polyester gel coat. Even with this mold-release material, the service life of the mold for repeated castings of deeply undercut, extended surface areas has not been adequate, the surface quality of the casting has been continually worsened in successive production runs and the equipment requirements for separation, e.g., 200–300 p.s.i. of compressed air jet to hammer and separate the shell mold at the edges, have increased the cost without any compensating improvement in quality.

The most widely used forms is concrete casting are plywood forms. In terms of the economics of mold use and service life, the plywood forms for poured concrete would be equally suitable for flat surfaces, even though they do not produce the smooth, non-grainy finishes on exposed concrete surfaces which is achieved with the fiberglass polyester plastic mold. The use of plywood forms leaves ragged edges and parting lines which require sandblasting of other finishing operations.

It is, therefore, an object of the present invention to overcome the above-mentioned defects and produce an improved form lining in a polyester fiberglass mold for the pouring of concrete structures which will yield improved surface finish and clean parting lines and provide limits of relatively close tolerances in undercut surfaces as will make unnecessary production centers with highly specialized heavy equipment, machinery and the use of heavy steel-reinforced molds fitted to the equipment.

It is a further object to produce a new mold lining in accordance with the present invention to permit the casting of large sections on the job to eliminate transport over greater or lesser distances from the production center to the building sites at substantial expense and with risk of damage in transit.

This object is accomplished by providing a new polyester gel facing layer material in the lining of the fiberglass polyester mold. This facing layer consists of a critical proportion of from 15 to 35% by weight of hydrophilic fiber as a water-absorbing component of the mold facing layer and the remainder is polyester gel constituting the binder material. The hydrophilic fiber component has the ability to absorb water from the freshly poured concrete surface but the fibrous filler material is chemically inert and does not react with any of the components of the concrete, especially free lime therein.

The fibrous component in the facing, in absorbing a limited amount of water from the freshly poured concrete, up to a maximum of 1–2% by weight of the cured gel facing layer, contributes to improved separation of the mold form from the concrete after the concrete has hardened; and, in conjunction with the type of organic mold-release material employed in the use of the plywood form, it provides for improved repetitive production operations while preventing corrosion and erosion of the mold inner surfaces.

The fibrous filler component of the novel gel facing must be comminuted to pass through 60 mesh openings of an American standard screen in order to achieve a sufficient fineness of particle size for proper mixing. Preferably, the particle distribution of the fibrous filler is between 10 and 90% through 100 mesh, between 5 and 30% through 300 mesh and in no case is the particle size so fine that the filler loses its fibrous characteristics. The fibrous characteristics are important to impart a frictional characteristic to the gel surface because there are produced minute fibrous protuberances at the surface which pick up a limited amount of water in the presence of the mold release agents which are conventionally employed.

The liquid polyester-styrene resins are widely available among commercial types, as mentioned in Schildknecht, "Vinyl and Related Polymers," John Wiley and Sons, 1952, at page 80. The liquid resin which is used for "pressureless" casting with glass fiber cloth in 3 to 20 ply layups may employ the conventional mixture of phthalic anhydride and maleic anhydride with such glycols as propylene glycol, dipropylene glycol or diethylene glycol, the fluidity of the resin being adjusted by dissolving the polyester in 20–40 weight percent based on composition weight of styrene monomer and containing from 0.1–5.0% of organic peroxide catalyst such as benzoyl peroxide, acetyl peroxide, methyl ethyl ketone peroxide, etc. The polyester may be based upon isophthalic, fumaric or adipic acid and the polyol may be hydrogenated bis-phenol, the dihydroxypropylene ether of bis-phenol or ethylene oxide additive of bis-phenol. The liquid resin formulations blended with at least 15% of the fibrous filler of the invention produces a matte surface in the cured gel facing layer after the mold has been conditioned with water in the presence of the mold-release material.

The mold-release material provides a substantially continuous film of organic, hydrophobic substance, such as kerosene, mineral oil, fatty acid dispersed in kerosene, fatty acid dispersed in mineral oil, carnauba wax dispersed in volatile hydrocarbon, carnauba wax dispersed in mineral oil and other waxes which are used as release agents in connection with plywood molds.

The fatty acid release material may be stearic acid, oleic acid, palmitic acid, arachidic acid, ricinoleic acid, linoleic acid, lauric acid or mixtures of these acids.

The mold-release material in film form is effective to block the transport of free lime from the concrete. Although the precise nature of the mechanism of film blockage performed by the hydrophobic mold release film is not understood, it has been observed that calcium stearate is formed in situ during the molding operation and that this calcium stearate effectively "floats" in a hydrophobic film state on the water-containing surface of the mold facing. It has also been discovered that the fibrous filler, especially talc or asbestos, chalks, e.g., the fiber of the filler is converted from a translucent appearance as embedded in the clear resin to a whitened condition, after being used to mold the cast concrete and it remains whitened. In a sense, once the mold has been conditioned, the concrete floats on the surface of the mold.

It has also been determined that the gel facing layer of the present invention is substantially more porous than the unfilled gel facing layer which has been used in the prior art. One would expect that this porosity would contribute to a less desirable surface finish; but surprisingly, this is not the case as observed in production. One would expect also that the greater surface porosity would result in greater surface erosion, but this is not the case as observed in production. Indeed, the service life of the present mold is 10 to 100 times greater than the service life of the molds of the prior art.

The conventional polyester gel facing layer which is applied to the backing of the rigid glass fiber reinforced polyester laminate of the prior art has embedded within its surface thickening fillers, such as colloidal silica. An example of a gel coat of the prior art containing colloidal hydrophobic silica is quoted as follows from the Graham et al. U.S. Patent No. 3,124,626:

"The coat is comprised of the reaction product of about 1.2 moles of propylene glycol with a mixture of 0.5 mole of maleic anhydride and 0.5 mole phthalic anhydride dissolved in 20 to 40 weight percent, based on composition weight, of styrene monomer (preferably about 35 weight percent styrene) and containing about 50 weight percent of combined conventional extender, filler and pigment including about 3 weight percent of an expanded silica (such as 'Cab-O-Sil') as a thixotropic agent."

It should be noted that the purpose of the expanded silica is to thicken the polyester gel and the thickening capability of this hydrophobic silica material is based upon its oil absorption characteristics, e.g., a direct index of its hydrophobic qualities.

In contrast to the 3% loading of the gel coat of Graham et al. with extremely fine particle size hydrophobic silica, the present invention employs in the polyester binder hydrophilic fibrous talc, hydrophilic fibrous asbestos, hydrophilic regenerated cellulose, hydrophilic polyvinyl alcohol fibers and hydrophilic caprolactam fibers as preferred embodiments, all of which are found, based on experience, to be highly water absorptive and have low absorption for the mold release agent; and each is used in an amount of from 6 to 12 times greater than the amount of silica employed by Graham et al.

Each of the foregoing fibers, which is in the class of synthetic monofilament fibers or chopped cotton fibers, must have a critical particle size, e.g., the denier weight must be 2–10 denier weight per filament for the synthetic fibers, the same denier limitation must be observed for the cotton fibers, 60% of the fibers must be less than $\frac{1}{32}$ inch in length, 90% of the fibers must be less than $\frac{1}{16}$ inch in length, 100% of the fibers must be less than $\frac{1}{8}$ inch in length, the lower limit of the fiber size must be such that it retains its fibrous characteristics, e.g., about $\frac{1}{1000}$ inch in length, and the concentrations of this fibrous filler in the gel coating must be at least 15%, preferably 21–28% by weight, of the cured gel. It should be noted that this concentration is significantly different than the optimum concentration for asbestine in grades 625, 5X and X.

It is remarkable that the hydrophilic fibrous talc filler of the present invention does not, after being embedded in the polyester gel facing, absorb the mold-release material because the supplier of the talc filler specifies a talc material which by itself has a substantial water absorption.

By way of example, the preferred hydrophilic mineral fibrous fillers are fibrous talc and fibrous asbestos. As these fillers are reduced in particle size to the point where they lose their fibrous characteristics, their oil absorption values become higher, their water absorption characteristics become lower and their usefulness as fillers in the invention becomes less. The preferred talc material is "asbestine 5X." Other grades may be used but it is essential that the fibrous character of the filler be maintained. A talc of the very finest grade, e.g., "abestine grade 625," which has an average particle size of less than 1.8 microns and the maximum oil absorption value in the grades supplied by the manufacturer, International Talc Company, Inc., 90 West St., New York, N.Y., is less preferred and it is not sufficiently fibrous to be used by itself in the absence of some coarser particles, as with "asbestine 5X."

Since, as is well-known, maximum thickening is achieved with smallest particle size, it is preferred to blend "asbestine 625" with "asbestine 5X" or with "asbestine X" where it is desired to practice the invention close to the lower limit of proportions, e.g., between 15–22% fibrous filler by weight of the cured gel.

The mixing of coarse and fine particle sizes of fibrous talc facilitates the control of the thickness of the gel facing during the hand layup operation.

From the point of view of economy, the fibrous talc of coarser grade is preferred and its water absorption characteristics (water absorption in cc. per 100 grams of 145 to 165) render it far superior to those of the very fine particle grade both in regard to freedom from corrosion and superior resistance to erosion in making fine quality castings.

Another critical property of the highly loaded hydrophilic fiber filled polyester gel coating is the chemical inertness of the fiber, in respect to reaction with the components of the polyester. For example, despite the substantial oil absorbency of fibrous talc, per se, it is wholly nonreactive towards any of the resin forming components, e.g. polyester, styrene, peroxide catalysts, etc., and is generally non-reactive with the concrete components.

Other and further objects of the present invention will appear from the more detailed description set forth below, it being understood that such more detailed description is given by way of illustration and explanation only and not by way of limitation, since various changes therein may be made by those skilled in the art without departing from the scope and spirit of the present invention.

In connection with the more detailed description, there is shown in the drawings to which legends as well as numbers have been applied, in FIG. 1, a plan view partly cut away of a floor mold including the novel lining facing layer of the present invention;

FIG. 2, a sectional view of the mold of FIG. 1; and

FIG 3, an enlarged detail of a part of the section of FIG. 2 taken along line 3—3.

The mold 10 illustrated in FIG. 1 is typical of a lightweight fiberglass reinforced construction employing the usual phthalic anhydride-maleic anhydride-propylene glycol polyester formation (5 mols, 5 mols and 11 mols respectively, corresponding to Example 2 of Singleton et al., U.S. Patent No. 2,944,994). This polyester is dissolved in about 35% by weight of styrene monomer, and the viscosity is adjusted to proper casting viscosity for "pressureless" casting and thorough impregnation of the glass cloth. About 1 weight percent of methyl ethyl ketone peroxide is added.

The woven reinforcing glass fabric 1, illustrated in FIG. 3, is completely saturated with the styrene polyester and the woven layers are separated by interlayers 2 and 4 of styrene polyester. Although woven glass cloth is shown as the reinforcing, any other suitable reinforcing material may be employed, such as woven rovings, glass mat, sisal mat or other very strong fibers which provide, in conjunction with the resin, the desirable reinforcement in high stress areas, especially the corners.

The form of mold illustrated in FIG. 1 is generally termed a "waffle pan" and is characterized by the special novel gel coat lining layer 3 about ⅛–¼" in thickness, this lining layer consisting essentially of styrene-polyester gel coating containing at least 15 and up to 35% of finely divided hydrophilic fibers. The preferred hydrophilic fiber is fibrous talc; and the preferred amount of 6–10 micron grade fibrous talc is between 28 and 35% by weight of said filler at the upper limit of proportions. The "asbestine" commercial talc is especially useful in an average particle size of between 1 and 10 microns. The preferred grade is "asbestine 5X," which has a particle size range of 6 to 10 microns and it produces outstanding results as can be seen from the following data which has been established by field testing.

A comparison was made of the recipe in the Graham et al. U.S. Patent No. 3,124,626 of styrene polyester casting resin employing a gel coat facing which is free from any filler other than "Cab-O-Sil" (expanded colloidal silica prepared by burning silicon tetrachloride in reducing vapor atmosphere of hydrocarbon and water) and represents a clear gel coating of the formula given at column 3, lines 45–55 of this Graham et al. patent with the identical styrene polyester composition containing 30% of fibrous talc filler, the fibrous talc having a particle size range of from 6 to 10 microns. This comparison entailed increasing the loading of the colloidal silica of the aerogel type from a minimum of 2% to a maximum of 5% in order to compare the physical properties of this gel facing composition with those of the present invention in which the new and totally unexpected results are achieved at a fibrous talc loading of from 3 to 6 times as great as the silica loading.

The physical properties of the Graham et al. liquid resin mixture applied as the gel coating demonstrated substantial thickening at 2% loading, optimum thickening and stiffening at 3% loading and undesirable shrinking and cracking of the gel facing at loadings from 4 to 5%. No more than 5% of the silica could be incorporated into the gel mixture because the material became too stiff for proper troweling application. It is necessary to maintain the thickness of the coating between ⅛ and ¼ inch and to achieve a good bond of the coating to the underlay without any possibility of air bubbles being entrained in the gel during the troweling operation. It is essential that the bond between the gel facing and the mold body be capable of withstanding hundreds of molding operations without separating. During this molding operation, this gel facing picks up water in an amount up to about 1% and chalks.

Surprisingly, there is very little shrinkage of the mold facing of the present invention at a loading of 30% of fibrous talc which is significant because the moisture pick up during conditioning with water is about twice as much as the moisture pickup of the silica filler at 3% loading.

A similar result is achieved in the instance of substitution of the fibrous talc with natural asbestos fibers which had been comminuted to a particle size in the range of from 100 to 300 mesh (10% through 200 mesh and 90% through 300 mesh). Similar beneficial results of substantially no shrinkage or cracking at high loading are observed if other hydrophilic fiber materials are employed at a minimum of 15% loading, preferably at the upper limit of the range between 22 and 35% of the fibrous filler by weight of the cured gel. The organic hydrophilic fibers which can be used are regenerated cellulose of 2–10 denier weight per filament, caprolactam fiber of 2–10 denier weight per filament, polyvinyl alcohol fibers of 2–10 denier weight per filament, cellulose acetate fibers of 2–10 denier weight per filament, ethyl cellulose fibers of 2–10 denier weight per filament, cellulose propionate fibers of 2–10 denier weight per filament, and the hydrophilic fibers of the 6,6-nylon type (linear polyamides prepared from hexamethylene diamine and adipic acid).

It has been determined by extensive testing that diatomaceous earth in any particle size range is completely unsatisfactory as a filler material at any filler loading in the range of 1–30% because it shrinks badly, wears badly, and, in the form of the cured gel coating, does not separate from the concrete.

Colloidal silica as the filler in the gel coating also prevents separation of the cured concrete from the mold form; e.g., in the form of the cured gel coating, the Graham et al. composition of U.S. Patent No. 3,124,626 used as the facing in the waffle pan construction of FIG. 1 herein could not be separated from the cured concrete in the presence of the mold release agents without the aid of air hammers and pressures of 200–300 pounds p.s.i. against the mold.

During the curing of concrete, heat is generally evolved as a result of chemical reaction. Tests carried out by the inventor were conducted at 150° F. to duplicate the temperature conditions encountered during the actual hardening of the concrete foundation 20 which is shown in FIG. 2. Under these heating conditions, the cured gel facing empolying the fibrous talc filler at 30% loading of the present preferred example showed a water pickup of about 0.8% under test conditions in which the molds were wiped dry before weighing.

Test pieces 1" x 1" x ¼" were coated with a ¹⁄₁₆" layer of gel facing. Some were immersed in kerosene for 6 hours at 150° F. to ascertain immunity from attack by hydrocarbon mold release agent. Others were immersed in a dispersion of 40% stearic acid in kerosene which was maintained at 150° F. for six hours. Others were immersed in water at 150° F. for twenty-four hours. A comparison was run with test pieces of identical size and base which were coated with "Cab-O-Sil" at 5% loading.

All samples were dried in an oven at 150° F. for 24 hours and then weighed.

The test squares embodying the facing coating of the present invention lost 0.3% by weight as a result of the kerosene treatment. The weight loss was the same as a result of the stearic acid-kerosene treatment. The water treated squares showed a weight gain of 0.8%.

The test squares coated with the "Cab-O-Sil" coating lost 0.3% by weight as a result of the kerosene immersion and also as a result of the stearic acid-kerosene treatment. The water treated "Cab-O-Sil" coated squares gained 0.5% by weight.

The other major distinction which was immediately noticed in the talc filled squares of the present invention was the development of a whitened or chalked surface on these squares which had been immersed in water. The "Cab-O-Sil" coated test squares which had been immersed in water showed no chalking whatsoever.

Additional tests were run to determine the rate of water pickup and it was found that only 0.4% (one-half of the total) moisture pickup occurred at 150° F. during the first 6 hours of total immersion. Not until 24 hours of immersion had elapsed, was the water pickup of 0.8% achieved. After 135 hours at 150° F., the water pickup was 1.5%.

In contrast, the "Cab-O-Sil" coated square picked up moisture much more slowly, 0.2% after 6 hours and 0.42% after 24 hours. After 135 hours at 150° F., the pickup of the "Cab-O-Sil" squares was 0.7%.

The rate of pickup in the stearic acid-kerosene immersion medium was then tested for the samples which had previously been subjected to the water immersion treatment.

In contrast to the initial 0.8% water pickup described above, there was observed a loss of 0.3%, so that the total net water pickup was 0.5%. Under the same test conditions, the "Cab-O-Sil" treated squares showed a total net water pickup of 0.25%.

From the foregoing, it can be seen that the water pickup at the mold lining surface of the present invention is about twice that of the lining composition of the Graham et al. patent. This higher absolute value of water absorption for the gel facing of the present invention results from a loading of fibrous filler which is 6 times greater than the silica loading of the prior art. The total water absorption is under 1.5% by weight of the cured gel facing layer; yet it facilitates mold separation from the cured concrete in a totally unexpected fashion.

It has been discovered that the chalking phenomenon, described above, uniquely associated with the 0.8% water pickup of the present mold facing, is a distinguishing criterion of mold conditioning to characterize those molds which are easily separable from the cured concrete. This whitened condition occurs during the first use of the mold and remains permanently thereafter. Each instance of casting exposes the mold to a new water conditioning treatment. The conditioning treatment is renewed in the presence of the organic hydrophobic mold release material, such as kerosene, fatty acid dispersed in kerosene, mineral oil, fatty acid dispersed in mineral oil, carnauba wax dispersed in volatile hydrocarbon and carnauba wax dispersed in mineral oil.

The special molds made of fiberglass reinforced polyester resin with the new lining of the invention provide a new and superior tool for the preparation of architectural concrete and cost stone. All of the reinforced plastic backing structures are light in weight, extremely durable, dimensionally stable, and will not deform in use. More important, they will not erode.

The finished concrete castings have excellent surface finish as a result of the mold lining, thereby minimizing both the expense of subsequent finishing and the patchy effect resulting from spot repairs. The molds of the invention are simple to erect; they assembly tightly and securely; and, most important, they strip easily.

The present molds made of reinforced plastics afford the architect design freedom and design control which are not obtainable with conventional molds. The architect can now indulge his desire for freedom of form because of the economy of these fiberglass reinforced plastic molds. These molds, with the new lining, are a very economical system for manufacturing cast stone and reinforced concrete at the site where cost is a primary factor.

The great advantage of improved mold separation and stripping achieved as the result of incorporating the low cost, unique class of inorganic fibrous filler (talc or asbestos) or the organic fibrous fillers (cellulose ester, ether, nylon or polyvinyl alcohol types) permits the design of mold constructions in which the entire mold is made from a single casting composition, the mold being reinforced in the usual way. In this way, the fiberglass reinforced styrene-polyester mold is filled throughout its entire thickness with the critical proportions of the special hydrophilic fibrous filler whereby any surface of the mold, after conditioning in water, becomes a parting surface and in conjunction with the mold-release material, such as kerosene, mineral oil, fatty acid dispersed in mineral oil, fatty acid dispersed in kerosene, carnauba wax dispersed in mineral oil and carnauba wax dispersed in volatile hydrocarbon, facilitates stripping. Thus, opposing surfaces of the mold may each be used to provide a form member of extended surface area uniquely adapted for poured concrete.

The composition utilized in making the mold is new and capable of use as an antiskid floor and stair tread material, independent of its use in making a fiberglass reinforced mold. In this connection, it may be desirable to add a pigment for coloration, e.g., a small amount of titanium dioxide for a white, iron oxide for shades of yellow to brown, ultramarine, prussian blue or indigo for blue, lead chromate for orange, chromium oxide for green, cadmium sulfide for red and carbon black for black. These pigments are mixed into the styrene-polyester liquid in the minimum amounts required for the desired shade and generally in an amount of 8 ounces to one pound per gallon of the vehicle. This pigment performs no function other than tinting and is distinctly different in its characteristics than the present fibrous filler at the loading of 15–35% which provides the antiskid and frictional characteristics.

The styrene-polyester-fibrous filler mixture cures with peroxide to a matte or dull surface finish, transparent in the absence of pigment, and capable of being kept clean in a public walking area. The material, used in the form of a plastic tile surface, can be adhered to concrete preferably with a sodium silicate sealing coat to pretreat the concrete. The thickness of the gel composition is such that it can be applied by troweling or by using blowing (coarse spraying) equipment.

Having thus disclosed the invention, what is claimed is:

1. A form member of extended surface area for poured concrete structures comprising: (a) a backing formed of a rigid, glass fiber reinforced, cured styrene-polyester laminate; and (b) a chemically inert finely divided hydrophilic fibrous filler containing cured styrene-polyester gel facing layer bonded to said backing, said facing layer varying in thickness from about 1⁄64″ to about 1⁄4″, said facing layer imparting a smooth surface to the poured concrete molded thereby and being adapted to withdraw from the freshly poured concrete a quantity of water up to about 1.5% by weight of the cured gel facing layer to condition the mold and to thereby facilitate separation of the mold form from the concrete after the concrete has hardened, there being present in said gel facing at least from about 15 to 35% of said finely divided hydrophilic fiber by weight of said facing layer, said fiber being selected from the group consisting of ethyl cellulose, regenerated cellulose, cellulose acetate, cellulose propionate, caprolactam, polyvinyl alcohol and chopped cotton, said textile fiber having a filament denier weight of from 2 to 10, 100% of the fibers being less than 1/8 inch in length, 90% of the fibers being less than 1/16 inch in length and 60% of the fibers being less than 1/32 inch in length, said filled styrene-polyester gel facing layer being coated with a film of organic hydrophobic mold-release material, said hydrophobic film forming a barrier which blocks the transport of free lime from the concrete while floating against a film of water at the water-containing surface of the concrete during casting, the concrete being thereby effectively separated from the mold by a film of water, said release material being selected from the group consisting of kerosene, fatty acid dispersed in kerosene, mineral oil, fatty acid dispersed in mineral oil, carnauba wax dispersed in volatile hydrocarbon and carnauba wax dispersed in mineral oil.

2. An antifriction product consisting essentially of styrene-polyester containing 15–35% by weight of finely divided hydrophilic fibrous filler selected from the class consisting of polyhexamethylene adipamide fibers, regenerated cellulose, polyvinyl alcohol fibers, caprolactam fibers, cellulose acetate fibers, cellulose propionate fibers and ethyl cellulose fibers, each of said cellulosic and synthetic fibers having a filament denier weight of from 2 to 10, 100% of the fibers being less than 1/8 inch in length, 90% of the fibers being less than 1/16 inch in length and 60% of the fibers being less than 1/32 inch in length.

References Cited by the Examiner

UNITED STATES PATENTS

| | | | |
|---|---|---|---|
| 2,703,051 | 3/1955 | Richardson | 18—47 XR |
| 2,820,252 | 1/1957 | Koch | 18—47 XR |
| 2,836,530 | 5/1958 | Rees | 18—47 XR |
| 2,846,742 | 8/1958 | Wagner. | |
| 2,907,070 | 10/1959 | Van Hartesveldt | 18—47 XR |
| 2,965,946 | 12/1960 | Sweet et al. | 18—47 XR |
| 3,242,247 | 3/1966 | Watson | 18—47 XR |

WILLIAM J. STEPHENSON, *Primary Examiner.*

J. HOWARD FLINT, Jr., *Examiner.*